(12) United States Patent
Kishi (10) Patent No.: US 11,430,271 B2
(45) Date of Patent: Aug. 30, 2022

(54) FUEL VAPOR TREATMENT APPARATUS (71) Applicant: DENSO CORPORATION, Kariya (JP)

(72) Inventor: Ryoyu Kishi, Kariya (JP)

(73) Assignee: DENSO CORPORATION, Kariya (JP)

(*) Notice: Subject to any disclaimer, the term of this patent is extended or adjusted under 35 U.S.C. 154(b) by 482 days.

(21) Appl. No.: 16/562,753

(22) Filed: Sep. 6, 2019

(65) Prior Publication Data

US 2020/0118363 A1 Apr. 16, 2020

(30) Foreign Application Priority Data

Oct. 15, 2018 (JP) .............................. JP2018-194178

(51) Int. Cl.
*G07C 5/08* (2006.01)
*B60K 15/03* (2006.01)
*F02M 25/08* (2006.01)
*G01M 3/32* (2006.01)

(52) U.S. Cl.
CPC ............ *G07C 5/0808* (2013.01); *B60K 15/03* (2013.01); *F02M 25/0818* (2013.01); *F02M 25/0872* (2013.01); *G01M 3/3236* (2013.01); *B60K 2015/0323* (2013.01); *B60K 2015/03243* (2013.01); *F02M 2700/05* (2013.01)

(58) Field of Classification Search
CPC .................. G07C 5/0808; B60K 15/03; B60K 2015/0323; B60K 2015/03243; F02M 25/0818; F02M 25/0872; F02M 2700/05; G01M 3/3236

USPC ......................................................... 701/30.3
See application file for complete search history.

(56) References Cited

U.S. PATENT DOCUMENTS

| | | | |
|---|---|---|---|
| 6,336,446 B1 * | 1/2002 | Isobe ................. | F02M 25/0809 123/198 D |
| 6,354,143 B1 * | 3/2002 | Isobe ................. | F02M 25/0809 73/49.7 |
| 2005/0072221 A1 * | 4/2005 | Itakura .............. | F02M 25/0818 73/114.39 |
| 2006/0016253 A1 * | 1/2006 | Kobayashi .......... | F02M 25/089 73/114.38 |
| 2007/0199374 A1 | 8/2007 | Shibuya | |
| 2014/0182360 A1 | 7/2014 | Horiba | |
| 2015/0013437 A1 | 1/2015 | Takakura | |
| 2019/0101072 A1 * | 4/2019 | Dudar ................ | F02D 41/0035 |

FOREIGN PATENT DOCUMENTS

| | | |
|---|---|---|
| JP | 6-117334 | 4/1994 |
| JP | 2017-141783 | 8/2017 |

* cited by examiner

*Primary Examiner* — Mahmoud Gimie
(74) *Attorney, Agent, or Firm* — Nixon & Vanderhye P.C.

(57) ABSTRACT

A fuel vapor treatment apparatus is provided with a fuel tank for storing fuel of an internal combustion engine, a canister for adsorbing fuel vapor generated in the fuel tank, a pump for reducing a pressure inside a detection target system including the fuel tank, a pressure detection sensor for detecting the pressure inside the detection target system, and a fluctuation detection unit for detecting a fluctuation width of the pressure inside the detection target system at the time when the pressure inside the detection target system is reduced to a predetermined pressure value.

15 Claims, 8 Drawing Sheets

FUEL VAPOR TREATMENT APPARATUS

CROSS REFERENCE TO RELATED APPLICATION

The present application is based on Japanese patent application No. 2018-194178 filed on Oct. 15, 2018, the entire contents of which are incorporated herein by reference.

FIELD

The present disclosure relates to a fuel vapor treatment apparatus.

BACKGROUND

In a fuel vapor treatment apparatus, which treats fuel vapor generated in a fuel tank of an internal combustion engine, it is known to perform a leak diagnosis based on a pressure change inside a fuel system after pressurization of fuel by a pump.

SUMMARY

A fuel vapor treatment device according to the present disclosure is provided with a fuel tank for storing fuel of an internal combustion engine, a canister for adsorbing fuel vapor generated in the fuel tank, a pump for reducing a pressure in a detection target system including the fuel tank, and a pressure detection sensor for detecting the pressure inside the detection target system. The fuel vapor treatment device is configured to perform a leak diagnosis.

EMBODIMENT

A fuel vapor treatment apparatus according to various embodiments will be described with reference to accompanying drawings.

First Embodiment

Figure 1:
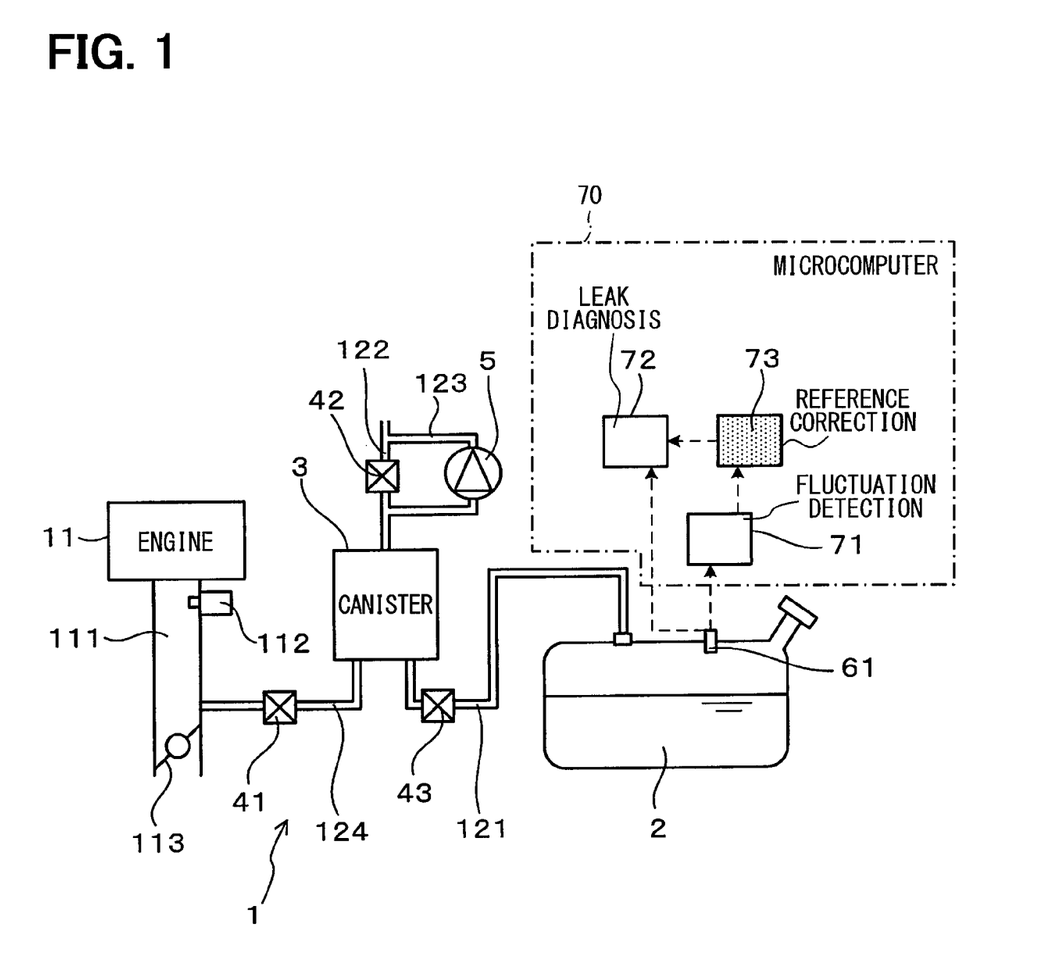
FIG. 1 is a structural view of a fuel vapor treatment apparatus according to a first embodiment.

As shown in FIG. 1, a fuel vapor treatment apparatus 1 includes a fuel tank 2, a canister 3, a pump 5, a pressure detection sensor 61, and a fluctuation detection unit 71.

The fuel tank 2 stores fuel of an internal combustion engine 11. The canister 3 adsorbs fuel vapor generated in the fuel tank 2. The pump 5 reduces a pressure in a detection target system including the fuel tank 2. The pressure detection sensor 61 detects the pressure inside the detection target system. The fluctuation detection unit 71 detects a width of fluctuation (pulsation), that is, a fluctuation width $\Delta P$ (see FIG. 3), of the pressure inside the detection target system which occurs when the pressure inside the detection target system is reduced to a predetermined pressure value.

The fuel tank 2 and the canister 3 are connected via a fuel vapor passage 121. That is, the fuel vapor passage 121 is provided to lead the fuel vapor evaporated in the fuel tank 2 into the canister 3 from the top of the fuel tank 2 to which the fuel vapor passage 121 is connected. Although the pressure detection sensor 61 is provided in the fuel tank 2 in the present embodiment, the pressure detection sensor 61 may alternatively be provided in the fuel vapor passage 121.

A purge passage 124 is provided to communicate the canister 3 and an intake system 111 of the internal combustion engine 11. The purge passage 124 is provided with a purge valve 41. The purge valve 41 is configured to control supply of the fuel vapor from the canister 3 to the intake system 111 by opening and closing the purge passage 124. In the intake system 111, an injector 112 is provided in the vicinity of an intake port of the internal combustion engine 11. Further, the purge passage 124 is connected at a downstream of a throttle valve 113 in the intake system 111 to introduce the fuel vapor from the canister 3 to the intake system 111, specifically between the injector 112 and the throttle valve 113.

A vent passage 122 is connected to the canister 3 for introducing atmospheric air. A vent valve 42 is provided in the vent passage 122. A bypass passage 123 is connected to the vent passage 122 in a manner bypassing the vent valve 42. The pump 5 is connected to the bypass passage 123.

The pump 5 is configured to discharge gas from the canister 3 into the atmosphere. By closing the purge valve 41 and the vent valve 42, the inside of the system including both the canister 3 and the fuel tank 2 is fully closed. This closed system is a detection target system. In the present embodiment, the inside of the detection target system is also referred to as a diagnosis target system because it is also a target of leak diagnosis described later. The pump 5 is driven to operate with the purge valve 41 and the vent valve 42 closed. Thereby, the pressure in the diagnosis target system is reduced.

Further, in the present embodiment, the fuel vapor passage 121 is provided with a shutoff valve 43. The shutoff valve 43 is configured to be able to switch between communication and shutoff between the fuel tank 2 and the canister 3. The purge valve 41, the vent valve 42 and the shutoff valve 43 are all electromagnetically-operated solenoid valves.

By reducing the pressure in the fuel tank 2 and closing the shutoff valve 43, the system including the fuel tank 2 is made to be the closed system. This closed system is also in the detection target system (i.e., in the diagnosis target system).

Figure 2:
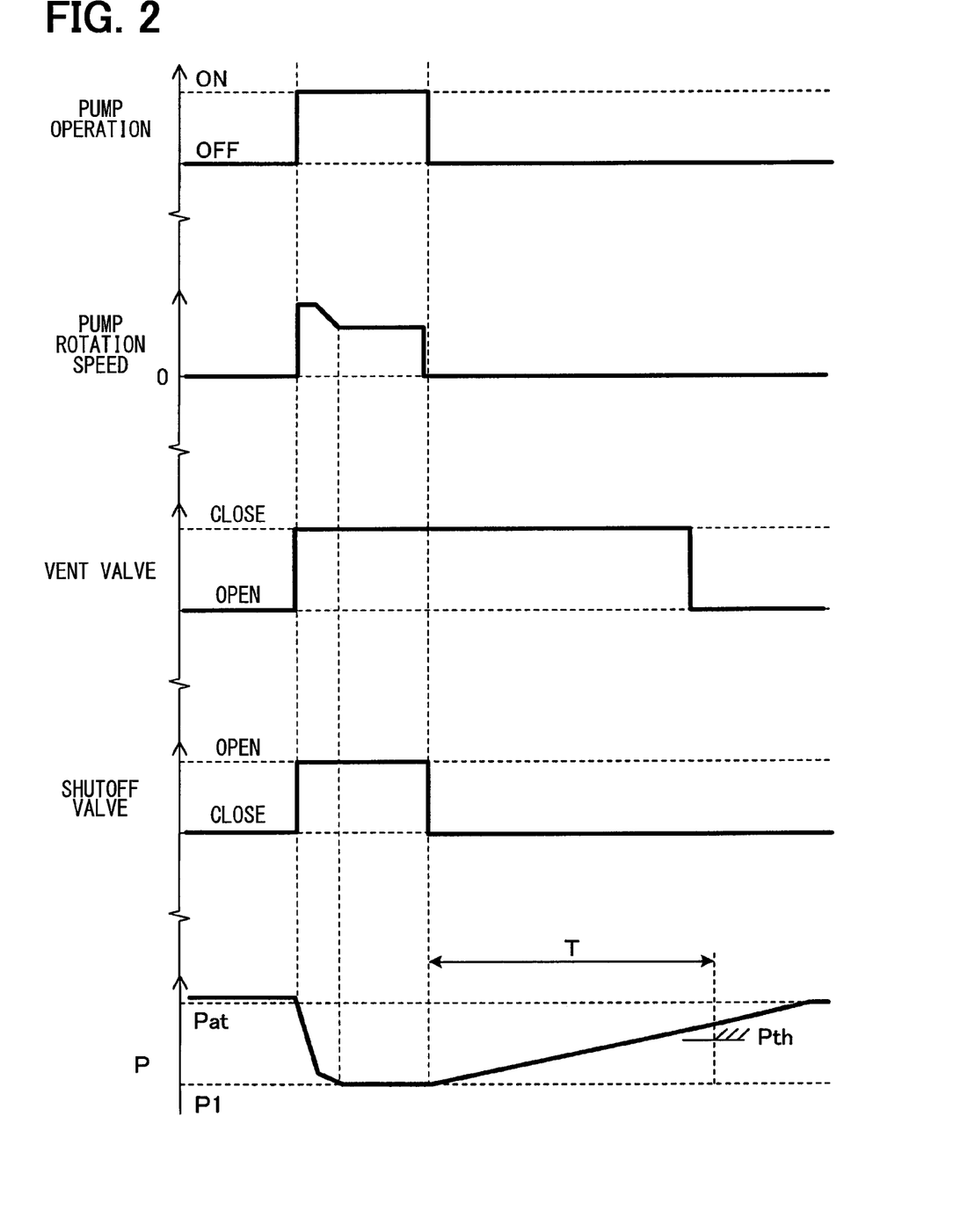
FIG. 2 is a time chart of an operation of each component in the first embodiment.

The fuel vapor treatment apparatus 1 of the present embodiment includes a leak diagnosis unit 72 that diagnoses a gas leak between the inside and the outside of the diagnosis target system, which is a system to be diagnosed. The leak diagnosis unit 72 is configured to diagnose the leak between the inside and the outside of the diagnosis target system based on a pattern of increase of a detection value of the pressure detection sensor 61 after the pressure in the diagnosis target system is reduced to a predetermined pressure value as shown in FIG. 2. Specifically, the leak diagnosis is performed based on the amount of change per unit time of the detected pressure value.

The leak diagnosis in the diagnosis target system, which is to be diagnosed, may be performed as described below exemplarily. Here, the leak diagnosis will be described in relation to the diagnosis target system including the fuel tank 2 and a part of the fuel vapor passage 121 extending from the fuel tank 2 to the shutoff valve 43.

The leak diagnosis is performed generally as follows. As shown in FIG. 2, the shutoff valve 43 is opened with the purge valve 41 closed, the vent valve 42 is closed, and the pump 5 is operated. As a result, the pressure P in the diagnosis target system decreases with time. Then, after the pressure is reduced to a predetermined pressure value P1, the operation of the pump 5 is stopped and the shutoff valve 43 is closed. As a result, the inside of the diagnosis target system including the fuel tank 2 is closed in a negative pressure state.

It can be diagnosed that there is a leak when the pressure P rises toward the atmospheric pressure by a certain amount of change or more per unit time in this closed state. Under normal conditions, the pressure P (=P1) ideally does not change. However, even under normal conditions, a slight pressure rise may occur. For example, in case that a leak hole formed in the fuel tank 2 or the like constituting the diagnosis target system is a minute leak hole, a pressure rise occurs. However, if the leak hole is sufficiently small, the rate of pressure rise per unit time, that is, pressure rise speed, is sufficiently small. On the contrary, if the leak hole is of a certain size, the rate of pressure rise per unit time will be large. That is, in principle, the amount of change per unit time of the pressure P is varied in accordance with the size of the leak hole.

When the amount of change per unit time of the pressure P is too large, that is, when the rising speed of the pressure P is too high, it is diagnosed that there is an abnormal leak, for example, a leak hole with a diameter exceeding a reference value is present. On the other hand, when the amount of change per unit time of the pressure P is sufficiently small, that is, when the rate of increase of the pressure P is sufficiently small, it is normally diagnosed that there is no leak hole of diameter exceeding a reference value. For example, as shown in FIG. 2, when the pressure P in the diagnosis target system exceeds a threshold value Pth after a predetermined time T has elapsed from the time when the pump 5 is stopped and the shutoff valve 43 is closed, it is diagnosed as having an abnormal leak. In addition, it is determined that there is no abnormal leak when the pressure P in the diagnosis target system is equal to or lower than the threshold value Pth after the predetermined time T has elapsed from the time of stopping the pump 5 and closing of the shutoff valve 43. The vent valve 42 is opened when the predetermined time T has elapsed.

In the lowermost graph of FIG. 2, the broken line with Pat indicates the atmospheric pressure. The pressure below the broken line is a negative pressure with respect to the atmospheric pressure. The same applies to FIG. 4.

Although the leak diagnosis by the leak diagnosis unit 72 is performed based on the pattern of the pressure increase in the system to be diagnosed as described above, the pressure increase also changes depending on the fuel vapor pressure in the fuel tank 2. That is, the pattern of pressure rise in the diagnosis target system is influenced not only by the leak but also by the fuel vapor pressure.

Figure 4:
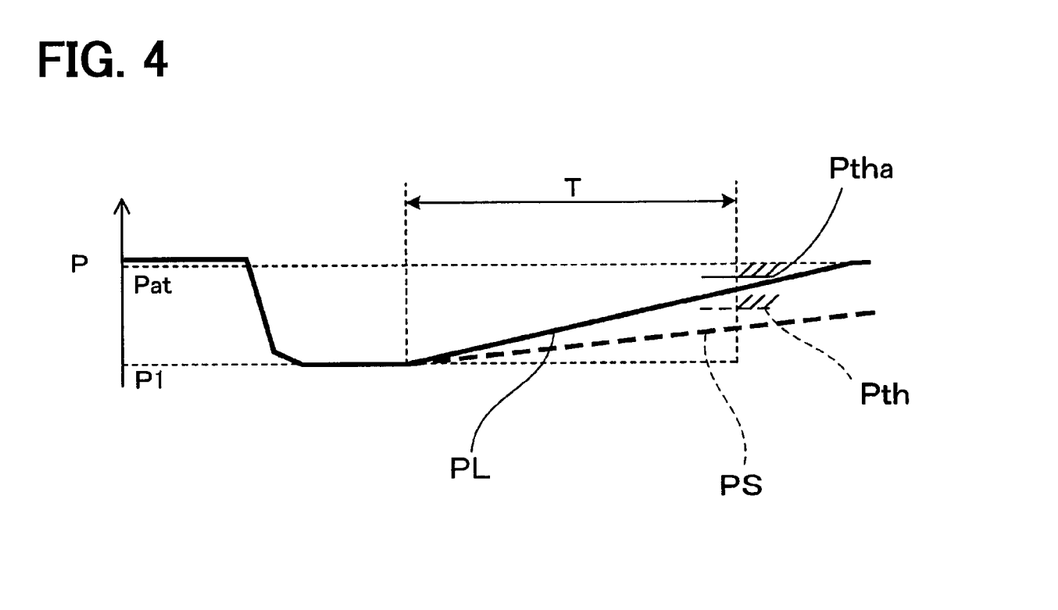
FIG. 4 is a time chart showing pressure fluctuation at the time of leak diagnosis in the first embodiment.

For example, when the vapor pressure of fuel is large, the fuel tends to evaporate in the depressurized diagnosis target system. Then, the pressure rise in the diagnosis target system detected by the pressure detection sensor 61 corresponds to a sum of the pressure rise due to the fuel evaporation and the pressure rise due to the inflow of atmospheric air from the leak hole. Therefore, even in case that the same leak hole exists, the pressure rises faster when the fuel vapor pressure is high than when the fuel vapor pressure is low, as shown in FIG. 4. In FIG. 4, a pressure change indicated by a solid line PL indicates a pressure change when the fuel vapor pressure is high, and a pressure change indicated by a broken line PS indicates a pressure change when the fuel vapor pressure is low.

Therefore, if the fuel vapor pressure is high, the leak diagnosis unit 72 will diagnose that there is an abnormal leak hole even if there is a minute leak hole which is not so problematical. That is, in the pressure change PL shown in FIG. 4, the value at the time when the predetermined time T has elapsed exceeds a threshold value Pth. That is, even when there is no abnormal leak, it is diagnosed erroneously that there is an abnormal leak.

By estimating the fuel vapor pressure to some extent, such an erroneous diagnosis is prevented. The estimation of the fuel vapor pressure is performed based on the detection value of the fluctuation width $\Delta P$ by the fluctuation detection unit 71. That is, when the pressure in the diagnosis target system is reduced to the predetermined pressure value, a difference between the vapor pressure of the fuel and the pressure in the diagnosis target system is generated and generates evaporation of the fuel. Therefore, a disturbance of the air flow at that time causes the pressure to be disturbed and causes pressure fluctuation. As the difference between the fuel vapor pressure and the pressure in the diagnosis target system is larger, the fuel evaporation is promoted more. Therefore, the fluctuation width $\Delta P$ of pressure also increases. That is, as the fuel vapor pressure is higher, the pressure fluctuation width $\Delta P$ is larger. Based on this relationship, the fuel vapor pressure is estimated from the pressure fluctuation width $\Delta P$.

Therefore, the fuel vapor treatment apparatus 1 of the present embodiment has a reference correction unit 73, which corrects a diagnosis reference (threshold value Pth) in the leak diagnosis performed by the leak diagnosis unit 72, based on the fluctuation width $\Delta P$ detected by the fluctuation detection unit 71. In the present embodiment, the reference correction unit 73 corrects the threshold value Pth described above and shown in FIG. 2. Hereinafter, the correction of the diagnosis reference by the reference correction unit 73 and the leak diagnosis by the leak diagnosis unit 72 in association with the fluctuation detection unit 71 will be described.

Figure 5:
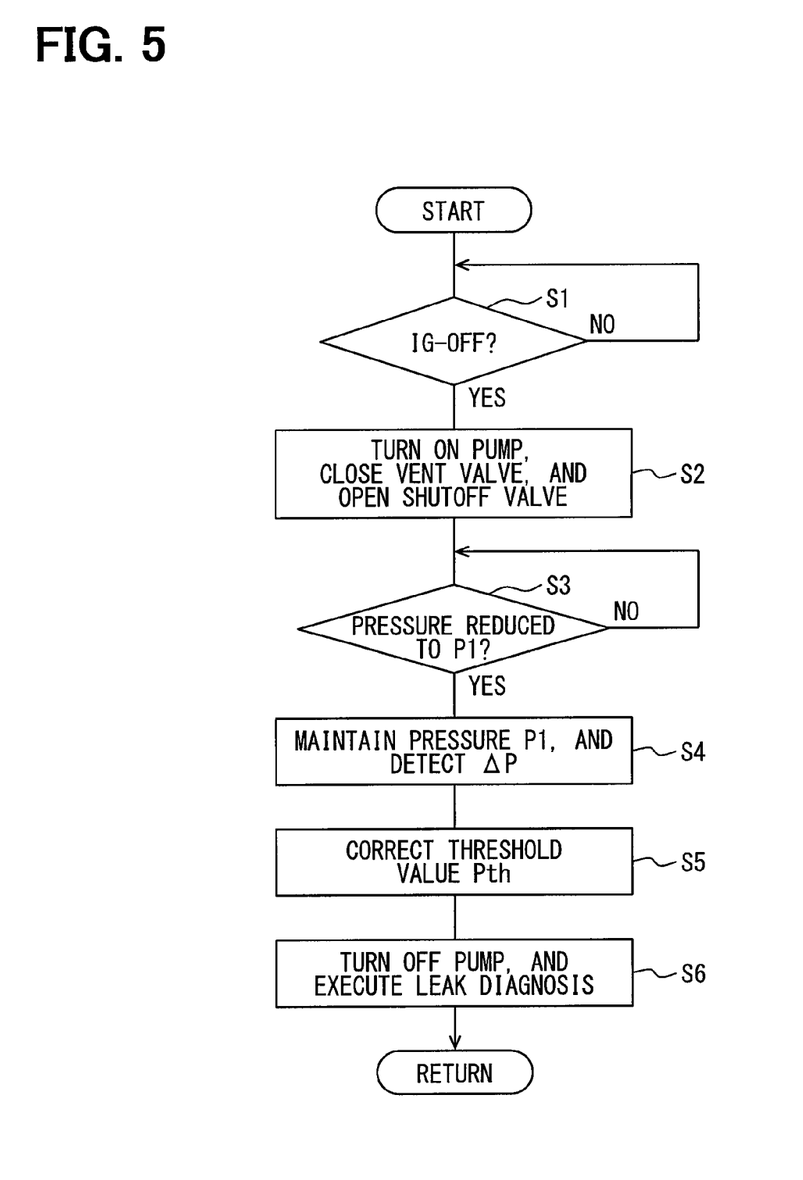
FIG. 5 is a flowchart of leak diagnosis executed in the first embodiment.

It is noted that, although the fluctuation detection unit 71, the leak diagnosis unit 72 and the reference correction unit 73 are shown separately as functional blocks, the functions of those units 71 to 73 may be performed by hardware processing of discrete circuits or by software processing by a microcomputer 70 configured to execute a control program stored in a memory (not shown) and shown in FIG. 5.

The fuel vapor treatment apparatus 1 of the present embodiment is mounted on a vehicle. The fuel vapor treatment apparatus 1 performs the leak diagnosis immediately after the stop of the vehicle, that is, at the end of driving. As shown in FIG. 5, when an ignition switch is turned off (step S1: YES) to stop the engine operation, the pump 5 is operated (step S2). It is noted that, as shown in FIG. 2, with the start of operation of the pump 5, the vent valve 42 is closed and the shutoff valve 43 is opened (step S2). At this time, the purge valve 41 is in the closed state.

Next, it is checked whether the detection value of the pressure in the diagnosis target system by the pressure detection sensor 61 has decreased to the predetermined pressure value P1 (step S3).

When it is determined that the pressure has been reduced to the pressure value P1, a rotational speed of the pump 5 is decreased and adjusted to maintain the pressure value P1 (step S4). Here, as shown in FIG. 2, the pump rotation speed may be gradually decreased just before the pressure value P1 is reduced to the pressure value P1. When the pressure value P1 is attained, the rotation speed of the pump 5 may be fixed to maintain the pressure P in the system constant at the pressure value P1.

Figure 3:
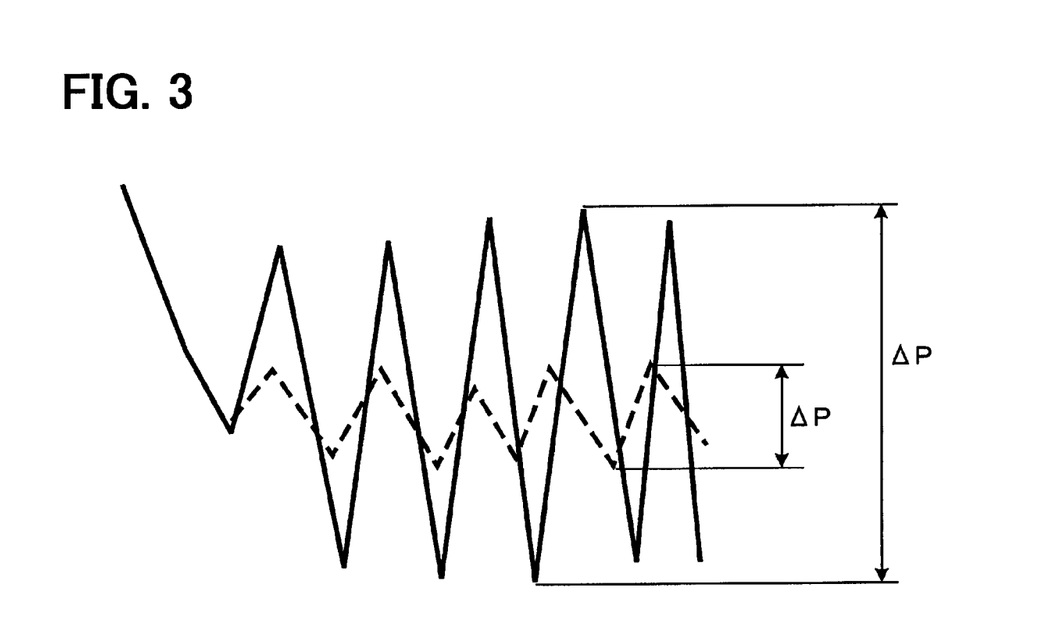
FIG. 3 is an enlarged explanatory view showing pressure fluctuation in the first embodiment.

As the function of the fluctuation detection unit 71, the fluctuation width $\Delta P$ of the pressure shown in FIG. 3 is detected while maintaining the pressure value P1 constant (step S4). Here, the amplitude of the fluctuation in a short time of the pressure acquired by the pressure detection sensor 61 is detected as the fluctuation width $\Delta P$.

Then, based on the acquired fluctuation width $\Delta P$, the diagnosis reference used for leak diagnosis is corrected (step S5) as the function of the reference correction unit 73. That is, since it is determined that the vapor pressure is high when the fluctuation width $\Delta P$ is large, the threshold value Pth is increased. Since it is determined that the vapor pressure is low when the fluctuation width $\Delta P$ is small, the threshold value Pth is decreased. It is noted that the threshold value Pth is corrected to an appropriate value according to the magnitude of the fluctuation width $\Delta P$. For example, when the fluctuation width $\Delta P$ is large, the threshold value Pth shown in FIG. 4 is increased to a value Ptha, which is closer to the atmospheric pressure Pat.

Then, the pump 5 is stopped and the shutoff valve 43 is closed. Thereby, the inside of the diagnosis target system including the fuel tank 2 is closed, and the substantial leak diagnosis is started (step S6) as the function of the leak diagnosis unit 72. That is, the time change of the pressure detection value P by the pressure detection sensor 61 is monitored. Then, the leak diagnosis is performed by comparing the threshold value Pth corrected in step S5 with the pressure detected at the time when the predetermined time T has elapsed.

That is, for example, when the fluctuation width $\Delta P$ is large, the pressure at the time when the predetermined time T has elapsed is compared with the corrected threshold value Ptha in the pressure change PL shown in FIG. 4. As a result, it is possible to prevent the pressure PL from exceeding the threshold value in case that the leak hole is within an allowable range. That is, erroneous diagnosis can be prevented.

The present embodiment provides the following functions and advantages over a conventional fuel vapor treatment apparatus, which does not have a function for detecting a fuel vapor pressure in a diagnosis target system. The fuel vapor pressure fluctuates in correspondence to not only temperature of the fuel in the system but also by a state of fuel such as fuel composition. For example, the pressure change in the above-described leak diagnosis also differs depending on the difference in the fuel vapor pressure. Therefore, when the state of fuel fluctuates and the fuel vapor pressure fluctuates, it is difficult to perform the leak diagnosis with high accuracy.

As opposed to the conventional fuel vapor treatment apparatus, the fuel vapor treatment apparatus 1 according to the present embodiment has the fluctuation detection function as the fluctuation detection unit 71. The fluctuation width $\Delta P$ of the pressure fluctuation in the diagnosis target system that occurs when the pressure in the diagnosis target system is reduced to the predetermined pressure value varies with the fuel vapor pressure. Therefore, it is possible to estimate the fuel vapor pressure from the detection value of the fluctuation width $\Delta P$ detected by the fluctuation detection function of the fluctuation detection unit 71. The estimated fuel vapor pressure can be used to improve the accuracy of the leak diagnosis in the evaporated fuel processing device 1.

Specifically, as described above, it is possible to estimate the fuel vapor pressure from the fluctuation width $\Delta P$. Thus, it is possible to correct the diagnosis reference, which is used in the leak diagnosis by the leak diagnosis unit 72, in correspondence to the fuel vapor pressure. Therefore, more accurate leak diagnosis can be performed.

The leak diagnosis unit 72 is configured to have the function of the leak diagnosis, which diagnoses the leak between the inside and the outside of the diagnosis target system based on the pattern of increase of the detection value of the pressure detection sensor 61 after the pressure in the diagnosis target system is reduced to the predetermined pressure value. As described above, the inside pressure of the diagnosis target system is reduced to be negative as a preparatory stage for the leak diagnosis. In this negative pressure state, the pressure fluctuation is likely to occur in correspondence to the fuel vapor pressure. Therefore, the detection result of the pressure fluctuation is more readily usable in the leak diagnosis operation. Further, since the diagnosis reference is corrected in accordance with the fluctuation width $\Delta P$, the leak diagnosis can be performed highly accurately. In addition, since it is not necessary to make the inside of the diagnosis target system a positive pressure, even if there is a leak hole, it is possible to prevent a large amount of evaporated fuel from being positively discharged from the leak hole from the leak hole.

Further, the detection of the fluctuation width $\Delta P$ of the fluctuation of the pressure in the diagnosis target system by the fluctuation detection is performed while controlling the pump 5 to suppress the increase or the decrease in the pressure in the diagnosis target system. Thereby, the fluctuation width $\Delta P$ of the pressure can be detected under the substantially constant pressure. That is, it is possible to measure the fluctuation width $\Delta P$ while maintaining a state in which time the fluctuation of the center value of pulsation hardly occurs, that is, a substantially constant state. Therefore, measurement of the fluctuation width $\Delta P$ with high accuracy becomes possible.

As described above, according to the present embodiment, it is possible to provide the fuel vapor treatment apparatus capable of estimating the fuel vapor pressure in the system to be diagnosed.

Second Embodiment

Figure 6:
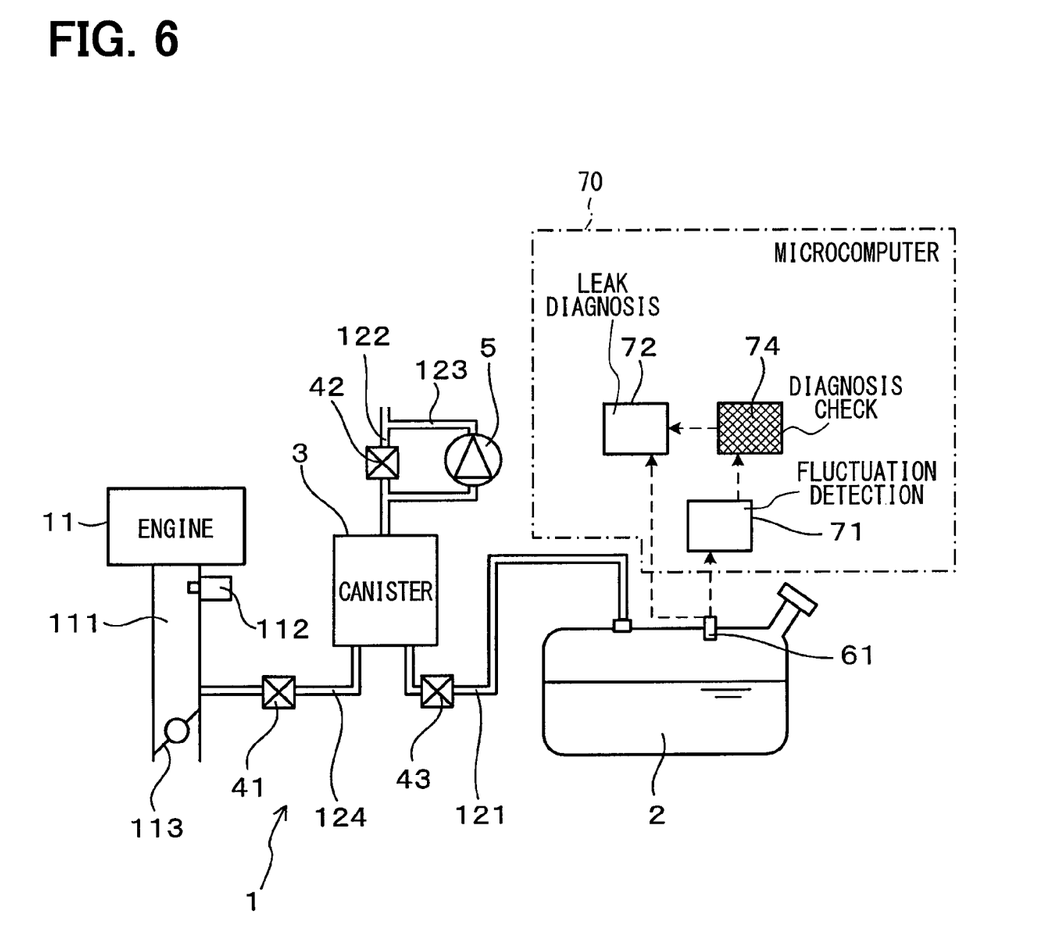
FIG. 6 is a structural view of a fuel vapor treatment apparatus according to a second embodiment.
Figure 7:
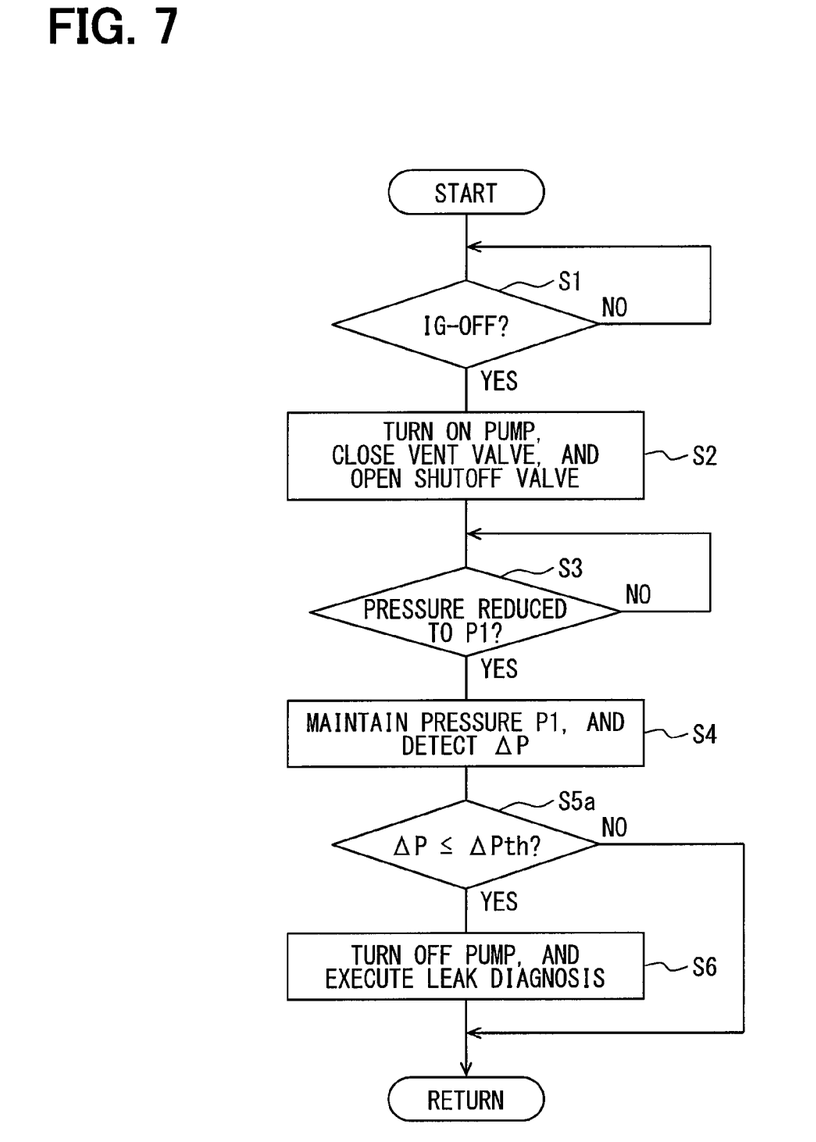
FIG. 7 is a flowchart of leak diagnosis executed in the second embodiment.

The fuel vapor treatment apparatus 1 according to a second embodiment is provided with a diagnosis check unit 74 as shown in FIG. 6 and FIG. 7. The diagnosis check unit 74 checks whether the leak diagnosis by the leak diagnosis unit 72 is to be performed based on the fluctuation width $\Delta P$ of the pressure detected by the fluctuation detection unit 71.

As described above, when the pressure fluctuation width $\Delta P$ is large, the fuel vapor pressure is high. Thus, the pattern of increase of the pressure in the diagnosis target system detected at the time of leak diagnosis by the leak diagnosis unit 72 is largely affected by the pressure rise due to fuel evaporation. As a result, it may become difficult to perform the leak diagnosis with high accuracy.

Therefore, in the present embodiment, the leak diagnosis is not performed when the fluctuation width ΔP detected by the fluctuation detection unit 71 is larger than a predetermined threshold value ΔPth. That is, the diagnosis check unit 74 checks whether to perform the leak diagnosis based on the fluctuation width ΔP.

FIG. 7 shows processes of diagnosis checking executed by the microcomputer 70, which operates as the fluctuation detection unit 71, the leak diagnosis unit 72 and the diagnosis check unit 74.

Steps S1 to S4 are the same as in the first embodiment. Then, following step S4, the fluctuation width P is compared with the threshold value ΔPth (step S5a) as the function of the diagnosis check unit 74. The threshold value ΔPth is set in advance as a fluctuation width ΔP corresponding to the fuel vapor pressure at which leak diagnosis with sufficiently high accuracy can be performed.

When it is determined that the fluctuation width ΔP is equal to or smaller than the threshold value ΔPth, the process proceeds to step S6. In step S6, the pump 5 is stopped, and the leak diagnosis is performed as the function of the leak diagnosis unit 72. On the other hand, when it is determined that the fluctuation width ΔP exceeds the threshold value ΔPth, the leak diagnosis is not performed by but postponed. When the leak diagnosis is not performed, the pump 5 is stopped and the vent valve 42 is opened.

Other operations are the same as in the first embodiment.

In the present embodiment, the leak diagnosis is stopped or postponed in case that there is a possibility of erroneous diagnosis. That is, it is possible to prevent the leak diagnosis from being performed in situations where the accuracy of diagnosis is likely to be lowered. It is thus possible to perform the leak diagnosis by selecting situations where the leak diagnosis can be performed with high accuracy. As described above, in addition to the similar functions and advantages as in the first embodiment, the leak diagnosis can be performed highly accurately.

Third Embodiment

Figure 8:
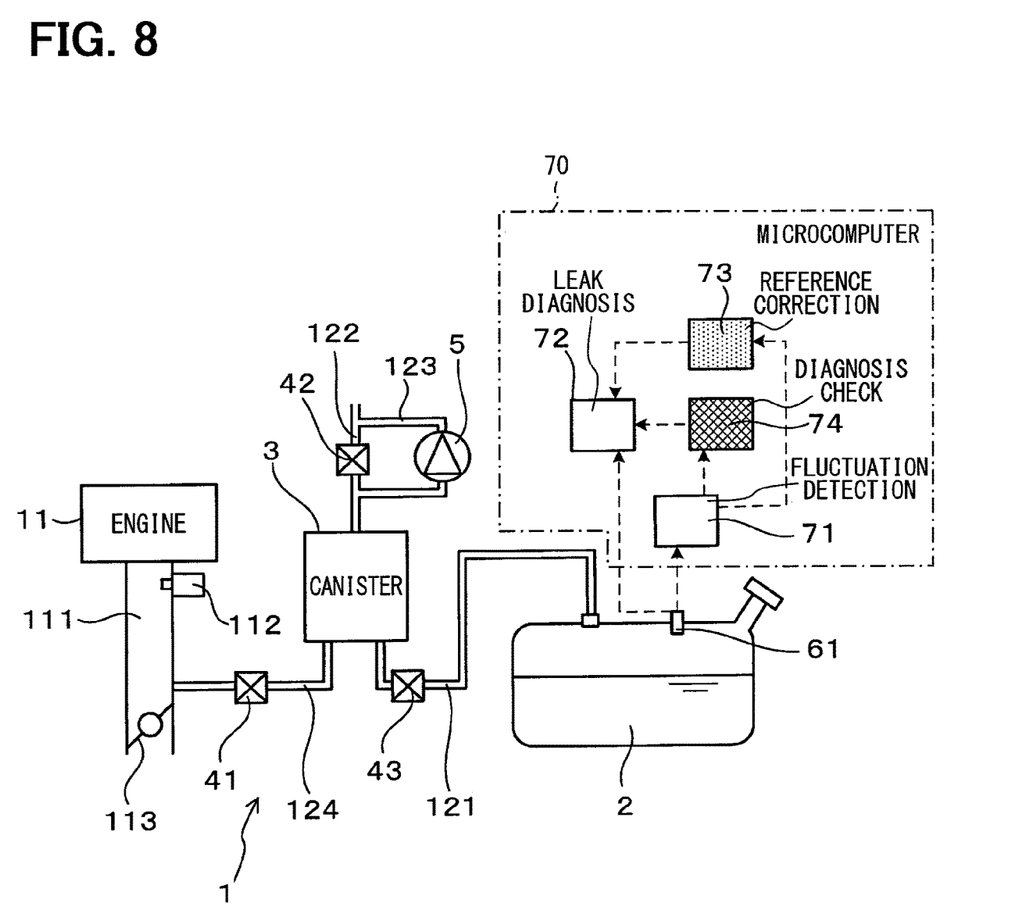
FIG. 8 is a structural view of a fuel vapor treatment apparatus according to a third embodiment.
Figure 9:
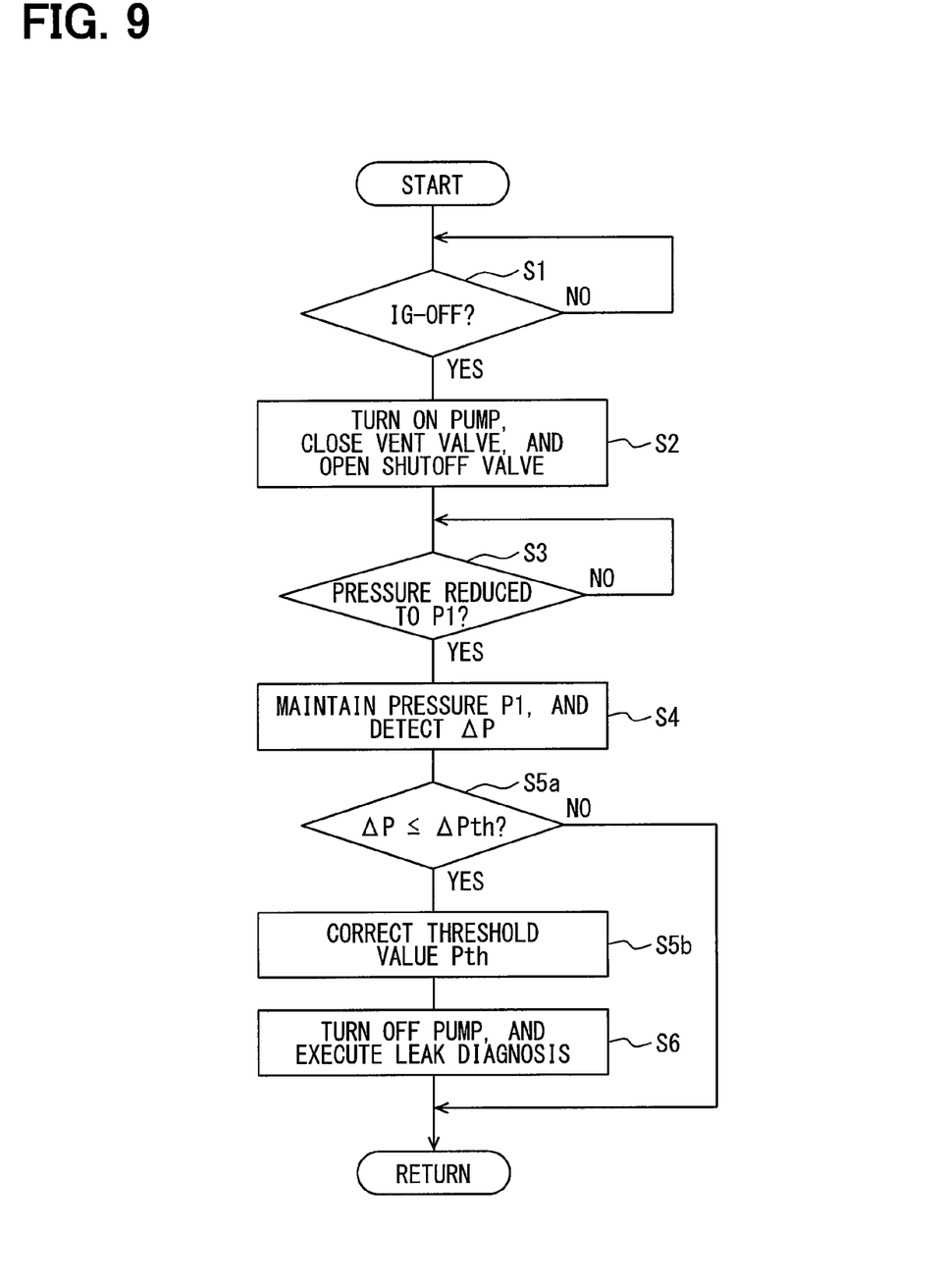
FIG. 9 is a flowchart of leak diagnosis executed in the third embodiment.

The fuel vapor treatment apparatus 1 according to a third embodiment is provided with the reference correction unit 73 and the diagnosis check unit 74 as shown in FIG. 8 and FIG. 9.

That is, the third embodiment corresponds to a combination of the first embodiment and the second embodiment.

In the present embodiment, various checks and controls are performed in performing the leak diagnosis as described below with reference to a flowchart shown in FIG. 9, which the microcomputer 70 executes as the functions of the fluctuation detection unit 71, the diagnosis unit 72, the reference correction unit 73 and the diagnosis check unit 74.

In FIG. 9, step S1 to step S5a are the same as in the second embodiment. It is noted however that the threshold value ΔPth in the present embodiment need not be the same as the threshold value ΔPth. For example, the threshold value ΔPth in the present embodiment can be set larger than the threshold value ΔPth in the second embodiment.

In step S5a, when it is determined by the diagnosis check that the fluctuation width ΔP is equal to or smaller than the threshold value ΔPth, the threshold value ΔPth, which is the diagnosis reference for the leak diagnosis, is corrected (step S5b) as the function of the reference correction unit 73. Here, the correction of the threshold value Pth is performed based on the fluctuation width ΔP as in the first embodiment.

When it is determined in the diagnosis check that the fluctuation width ΔP exceeds the threshold value ΔPth, the leak diagnosis is not performed but postponed.

Other operations are the same as in the first embodiment.

In the present embodiment, both advantages of the first embodiment and the second embodiment are provided. Thereby, highly accurate leak diagnosis can be performed effectively.

In the embodiments described above, the presence or absence of the abnormal leakage is determined as one example based on the pressure present after the predetermined time T. The presence or absence of the abnormal leakage may alternatively be determined based on, for example, a time interval elapsing until the pressure rises to a predetermined pressure value.

Further, in the above embodiments, the leak diagnosis is performed in regard to the closed system on the fuel tank side relative to the shutoff valve, as the diagnosis target system. The diagnosis target system is not limited to the disclosed example. For example, the diagnosis target system may be a closed system, which is formed of the fuel tank 2 and the canister 3 with the vent valve 42 and the purge valve 41 being closed and the shutoff valve 43 being opened. The fuel vapor treatment apparatus 1 may be formed without the shutoff valve 43.

The present disclosure is not limited to the embodiments described above, and various modifications may be adopted within the scope of the present disclosure without departing from the spirit of the disclosure.

What is claimed is:

1. A fuel vapor treatment apparatus comprising:
   a fuel tank for storing fuel of an internal combustion engine:
   a canister for adsorbing fuel vapor generated in the fuel tank;
   a pump for reducing a pressure in a detection target system including the fuel tank;
   a pressure detection sensor for detecting the pressure inside the detection target system;
   a fluctuation detection unit for detecting a fluctuation width indicating a width of a fluctuation of the pressure inside the detection target system, the fluctuation being generated when the pressure inside the detection target system is reduced to a predetermined pressure value;
   a leak diagnosis unit for diagnosing a leakage of gas between the inside and an outside of the direction target system based on a change amount per unit time of the detection value of the pressure detection sensor after reduction of the pressure inside the detection target system; and
   a reference correction unit for correcting a diagnosis reference, with which the detection value of the pressure inside the detection target system is compared to perform the leak diagnosis in the leak diagnosis unit, based on the fluctuation width of the pressure detected by the fluctuation detection unit.

2. The fuel vapor treatment apparatus according to claim 1, further comprising:
   a diagnosis check unit for checking, based on the fluctuation width of the pressure detected by the fluctuation detection unit, whether the leak diagnosis by the diagnosis unit is to be performed.

3. The fuel vapor treatment apparatus according to claim 1, wherein:
   the fluctuation detection unit is configured to detect the fluctuation width of the pressure detected by the fluctuation detection unit by suppressing an increase or an decrease in the pressure inside the detection target system.

4. The fuel vapor treatment apparatus according to claim 1, wherein:
the leak diagnosis unit diagnoses the leakage of gas between the inside and the outside of the detection target system by comparing the change amount per unit time of the detection value of the pressure detection sensor with the diagnosis reference which is set variably with the fluctuation width of the pressure.

5. The fuel vapor treatment apparatus according to claim 2, wherein:
the leak diagnosis unit performs the leak diagnosis only when the fluctuation width of the pressure is smaller than a predetermined threshold value.

6. The fuel vapor treatment apparatus according to claim 1, wherein:
the pump is driven to reduce the pressure in the detection target system after the internal combustion engine is stopped.

7. A fuel vapor treatment apparatus comprising:
a fuel tank for storing fuel of an internal combustion engine;
a canister for absorbing fuel vapor generated in the fuel tank;
a pump for reducing a pressure in a detection target system including the fuel tank;
a pressure detection sensor for detecting the pressure inside the detection target system;
a fluctuation detection unit for detecting a fluctuation width indicating a width of a fluctuation of the pressure inside the detection target system, the fluctuation being generated when the pressure inside the detection target system is reduced to a predetermined pressure value; and
a leak diagnosis unit for diagnosing a leakage of gas between the inside and an outside of the detection target system based on a change amount per unit time of the detection value of the pressure detection sensor after reduction of the pressure inside the detection target system; wherein:
the leak diagnosis unit diagnoses the leakage of gas between the inside and the outside of the detection target system by comparing the change amount per unit time of the detection value of the pressure detection sensor with a diagnosis reference which is set variably with the fluctuation width of the pressure, and
the diagnosis reference is set to increase with an increase in the fluctuation width of the pressure.

8. A fuel vapor treatment apparatus comprising:
a fuel tank for storing fuel of an internal combustion engine:
a canister for adsorbing fuel vapor generated in the fuel tank;
a fuel vapor passage connecting the fuel tank and the canister;
a pressure detection sensor for detecting a pressure in the fuel tank; and
a microcomputer configured to perform processing of:
reducing the pressure in the fuel tank to a predetermined pressure value;
closing the fuel vapor passage to form a closed system, which includes the fuel tank and a part of the vapor passage, as a detection target system;
detecting a fluctuation width indicating a width of fluctuation of the pressure inside the detection target system after the pressure inside the detection target system is reduced to the predetermined pressure value;
diagnosing a leakage of gas between the inside and an outside of the detection target system based on a change amount per unit time of the detection value of the pressure detection sensor after reduction of the pressure inside the detection target system; and
correcting a diagnosis reference, which is used to perform the leak diagnosis, based on the fluctuation width of the pressure detected by the fluctuation detection unit.

9. The fuel vapor treatment apparatus according to claim 8, wherein the microcomputer is configured to perform further processing of:
checking, based on the fluctuation width of the pressure, whether the leak diagnosis is to be performed.

10. The fuel vapor treatment apparatus according to claim 8, wherein:
the microcomputer performs the processing of detecting the fluctuation width of the pressure by suppressing an increase or a decrease in the pressure inside the detection target system.

11. The fuel vapor treatment apparatus according to claim 8, wherein the microcomputer performs the processing of diagnosing the leakage of gas between the inside and the outside of the detection target system by comparing the change amount per unit time of the detection value of the pressure detection sensor with the diagnosis reference which is set variably with the fluctuation width of the pressure.

12. The fuel vapor treatment apparatus according to claim 9, wherein the microcomputer performs the leak diagnosis only when the fluctuation width of the pressure is smaller than a predetermined threshold value.

13. The fuel vapor treatment apparatus according to claim 9, wherein the microcomputer is configured to perform further processing of:
comparing the diagnosis reference with the detection value of the pressure inside the detection target system to perform the leak diagnosis.

14. The fuel vapor treatment apparatus according to claim 8, wherein:
the microcomputer performs the processing of reducing the pressure in the detection target system after the internal combustion engine is stopped.

15. A fuel vapor treatment apparatus comprising:
a fuel tank for storing fuel of an internal combustion engine;
a canister for absorbing fuel vapor generated in the fuel tank;
a fuel vapor passage connecting the fuel tank and the canister;
a pressure detection sensor for detecting a pressure in the fuel tank; and
a microcomputer configured to perform processing of:
reducing the pressure in the fuel tank to a predetermined pressure value;
closing the fuel vapor passage to form a closed system, which includes the fuel tank and a part of the vapor passage, as a detection target system;
detecting a fluctuation width indicating a width of fluctuation of the pressure inside the detection target system after the pressure inside the detection target system is reduced to the predetermined pressure value;
diagnosing a leakage of gas between the inside and an outside of the detection target system based on a change amount per unit time of the detection value of the pressure detection sensor after reduction of the pressure inside the detection target system;

diagnosing the leakage of gas between the inside and the outside of the detection target system by comparing the change amount per unit time of the detection value of the pressure detection sensor with a diagnosis reference which is set variably with the fluctuation width of the pressure; and setting the diagnosis reference to increase with an increase in the fluctuation width of the pressure.

* * * * *